(12) United States Patent
Li et al.

(10) Patent No.: US 7,844,664 B2
(45) Date of Patent: Nov. 30, 2010

(54) GROUP BASED COMMUNICATION METHOD, SYSTEM AND CLIENT

(75) Inventors: Bin Li, Shenzhen (CN); Xingliang Zhang, Shenzhen (CN); Xiang Ren, Shenzhen (CN); Youyao Lin, Shenzhen (CN)

(73) Assignees: Huawei Technologies Co., Ltd., Shenzhen (CN); Tencent Technology (Shenzhen) Company Ltd., Shenzhen (CN)

( * ) Notice: Subject to any disclaimer, the term of this patent is extended or adjusted under 35 U.S.C. 154(b) by 246 days.

(21) Appl. No.: 11/916,790

(22) PCT Filed: Jun. 9, 2006

(86) PCT No.: PCT/CN2006/001263

§ 371 (c)(1),
(2), (4) Date: Dec. 6, 2007

(87) PCT Pub. No.: WO2006/131079

PCT Pub. Date: Dec. 14, 2006

(65) Prior Publication Data

US 2008/0195706 A1    Aug. 14, 2008

(51) Int. Cl.
*G06F 15/16* (2006.01)
(52) U.S. Cl. .............. 709/204; 709/201; 709/203; 709/205; 709/206; 709/207
(58) Field of Classification Search .......... 709/201, 709/203, 204, 206, 207, 212, 217
See application file for complete search history.

(56) References Cited

U.S. PATENT DOCUMENTS 7,124,164 B1 * 10/2006 Chemtob .............. 709/204
2004/0003090 A1 * 1/2004 Deeds .................. 709/227
2004/0125756 A1 * 7/2004 Lepore et al. ........... 370/261
2004/0177116 A1 * 9/2004 McConn et al. ......... 709/204
2005/0044144 A1   2/2005 Malik et al.
2005/0210394 A1 * 9/2005 Crandall et al. ......... 715/752

FOREIGN PATENT DOCUMENTS

CN        1487706       4/2004

OTHER PUBLICATIONS

International Preliminary Report on Patentability for International Application No. PCT/CN2006/001263, dated Dec. 11, 2007.
International Search Report for International Application No. PCT/CN2006/001263, dated Aug. 31, 2006.
Written Opinion for International Application No. PCT/CN2006/001263, dated Aug. 31, 2006.

* cited by examiner

*Primary Examiner*—Djenane M Bayard
(74) *Attorney, Agent, or Firm*—Marshall, Gerstein & Borun LLP

(57) ABSTRACT

The present invention discloses a group based communication method, including: initiating, by a communication initiating client, a connection request containing a recipient identifier to a backstage server; forwarding, by the backstage server, the connection request to a communication recipient client corresponding to the recipient identifier; and establishing, by the communication recipient client, a short connection channel or long connection channel to the communication initiating client according to a type of the connection request and performing a communication supported by the short connection channel or the long connection channel with the communication initiating client. The present invention also discloses a group based communication system and client. The method, system and client provided by the present invention brings out much richer communication and interaction between communicating users, who not only can transmit text data, but also can transmit file and audio/video data.

5 Claims, 4 Drawing Sheets

GROUP BASED COMMUNICATION METHOD, SYSTEM AND CLIENT

FIELD OF THE INVENTION

The present invention relates to network communication technology, and particularly, to a group based communication method, system and client.

BACKGROUND OF THE INVENTION

Instant Messenger (IM) tools are used widely inside and outside corporations for communication, however, a corporation usually does not want to invest in a server of self, but wish to use free-of-charge IM tools in public networks which provide more practical and convenient communication for small or middle-sized corporations, so as to provide the intercommunion across different departments of the corporation, within a corporation department and between the corporation and external contacts.

A user may establish a group with an IM tool for more convenient and effective communication among multiple members. In a group communication system of the prior art, a user may establish a discussion group for communication among multiple members. However, the communication is limited to plain text-based communication, in another word, only text-based communication of a multi-user discussion or a whole group is supported by the group communication system of the prior art.

FIG. 1 shows a method in the prior art. In this figure, a certain member 700 initiates a session request, packs a corresponding recipient member list and text information, and sends the packed text information and recipient member list to a backstage server 800, the backstage server 800 sends the text information to a recipient member 900 according to the recipient member list from the member 700 and finishes the session. It can be seen that in the group communication system of the prior art, the discussion group or group performs plain text-based communication and the group members also perform plain text-based communication.

The disadvantage of the prior art is that the communication between discussion groups, groups and members, which is based on text information transmission performed by the backstage server based on the recipient identifiers, cannot effectively support file transmission, multimedia audio and video interaction, because the backstage server cannot support to transmit huge data in file and multimedia audio and video, but only the small data in text information, in another word, the prior art cannot satisfy the needs of file transmission, multimedia audio and video interaction.

The prior art cannot provide sufficient support for communication among group members, yet the application scope of group communication are growing further to corporation groups along with the development of group services, which raises new requirements to the group communication system, in another word, members or colleagues need an advanced communication method, e.g., for file transmission or multimedia audio and video interaction. That means that the group members need not only plain text-based communication, but also advanced communication including file transmission, multimedia audio and video interaction.

SUMMARY OF THE INVENTION

The technical solution of the present invention is to provide a group based communication method, system and client, which are used for richer communication and discussion among users.

The group based communication method of the present invention includes:

initiating, by a communication initiating client, a connection request containing a recipient identifier to a backstage server;

forwarding, by the backstage server, the connection request to a communication recipient client corresponding to the recipient identifier; and establishing, by the communication recipient client, a short connection channel or long connection channel to the communication initiating client according to a type of the connection request and performing a communication supported by the short connection channel or the long connection channel with the communication initiating client.

The group based communication system provided by the present invention includes a first client corresponding to a communication initiating user, a second client corresponding to a communication recipient user, and a backstage server, wherein the backstage server is adapted to transmit a connection request between the first client and the second client, and the first client and the second client are adapted to establish a short connection channel or a long connection channel according to a type of the connection request and perform a communication supported by the short connection channel or the long connection channel.

The communication initiating client in the present invention sends a connection request to a communication recipient client through a backstage server, and the communication initiating client includes:

a first chat window loading unit, adapted to load a chat window and send data entered by a communication initiating user in the chat window to a communication type selection unit;

the communication type selection unit, adapted to pack a corresponding protocol type according to the data entered by the communication initiating user in the chat window, generate the connection request, and instruct, when a type of the connection request is long connection, a first long connection unit to open a network port corresponding to the long connection;

a communication transmission unit, adapted to send the connection request from the communication type selection unit to the backstage server; and the first long connection unit, adapted to open the network port corresponding to the long connection according to an instruction of the communication type selection unit.

The communication recipient client in the present invention receives a connection request from a communication initiating client through a backstage server, and the communication recipient client includes:

a communication receiving unit, adapted to receive the connection request from the backstage server and forward the connection request to a message management unit;

the message management unit, adapted to judge whether a type of the connection request is long connection or short connection, instruct a message prompting unit to prompt a message and instruct, when the type of the connection request is the long connection, a second long connection unit to establish a long connection channel to the communication initiating client;

the second long connection unit, adapted to establish the long connection channel to the communication initiating client;

a message prompting unit, adapted to prompt the message and instruct a second chat window loading unit to load a chat window; and the second chat window loading unit, adapted to load the chat window on the client.

According to another aspect of the present invention, the present invention further provides a client for initiating, as a communication initiating client, a connection request to a communication recipient client via a backstage server, and for receiving, as a communication recipient client, a connection request from a communication initiating client via a backstage server, comprising an initiating module and a recipient module, wherein the initiating module comprises:

a first chat window loading unit, adapted to load a chat window and send data entered by a communication initiating user in the chat window to a communication type selection unit;

the communication type selection unit, adapted to pack a corresponding protocol type according to the data entered by the communication initiating user in the chat window, generate the connection request, and instruct, when a type of the connection request is long connection, a first long connection unit to open a network port corresponding to the long connection;

a communication transmission unit, adapted to send the connection request from the communication type selection unit to the backstage server; and the first long connection unit, adapted to open the network port corresponding to the long connection according to an instruction of the communication type selection unit;

wherein the recipient module comprises:

a communication receiving unit, adapted to receive the connection request from the backstage server and forward the connection request to a message management unit;

the message management unit, adapted to judge whether a type of the connection request from the backstage server is the long connection or short connection, instruct a message prompting unit to prompt a message and instruct, when the type of the connection request is the long connection, a second long connection unit to establish a long connection channel to a communication initiating client;

the second long connection unit, adapted to establish the long connection channel to the communication initiating client;

the message prompting unit, adapted to prompt the message and instruct a second chat window loading unit to load a chat window; and the second chat window loading unit, adapted to load the chat window on the client.

Compared with the prior art, in the present invention, a corresponding connection channel over two parties of the communication is established according to a type of the connection request from a communication initiating client, so that the communication of the first type and the communication of the second type are separated and richer communication and discussion among users can be performed.

The present invention provides a more advanced communication manner for group users, including file transmission, multimedia audio and video interaction, and short message. Therefore richer communication among group members can be supported effectively, the interaction of group members is facilitated and the communication experience of group members is improved significantly.

Preferably, multiple authentication procedures can be performed before the advanced communication to effectively ensure the security of the group communication. Furthermore, the present invention is compatible with the prior art.

DETAILED DESCRIPTION OF THE INVENTION

A further detailed description is hereinafter given to this invention with reference to embodiments and accompanying drawings.

According to the group based communication method provided by the present invention, a communication initiating client sends a connection request containing a recipient identifier to a backstage server, the backstage server forwards the connection request to a communication recipient client corresponding to the recipient identifier; the communication recipient client then establishes a short connection channel or long connection channel to the communication initiating client according to a type of the connection request and performs a communication supported by the short connection channel or long connection channel with the communication initiating client.

Figure 1:
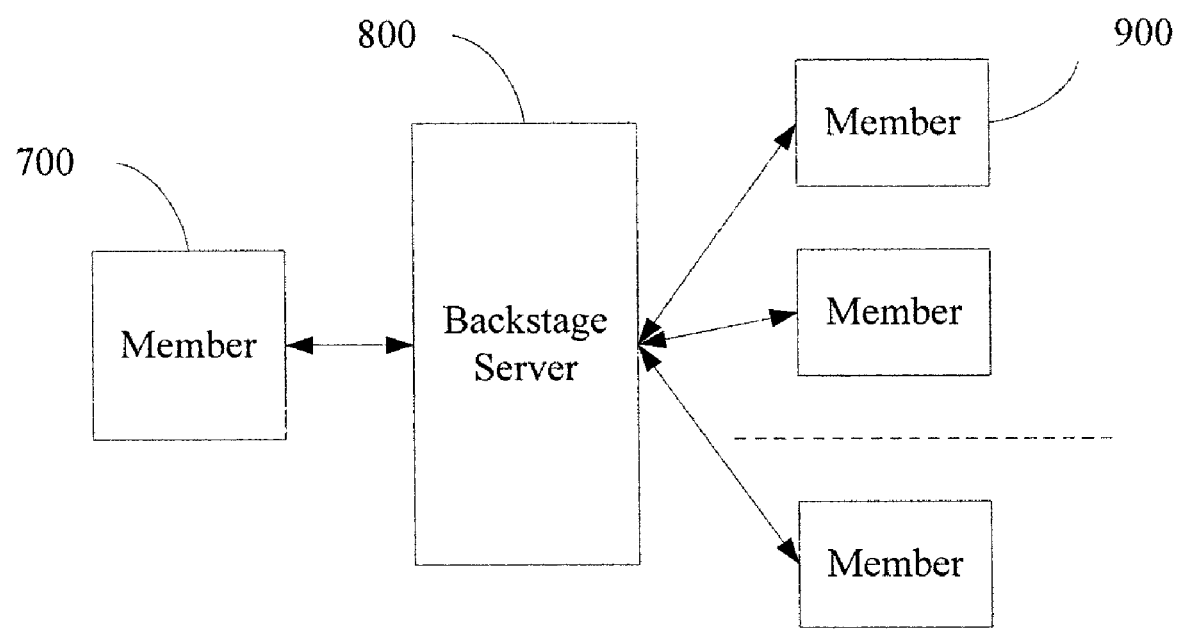
FIG. 1 is a schematic diagram of text-based communication among group members in the prior art.
Figure 2:
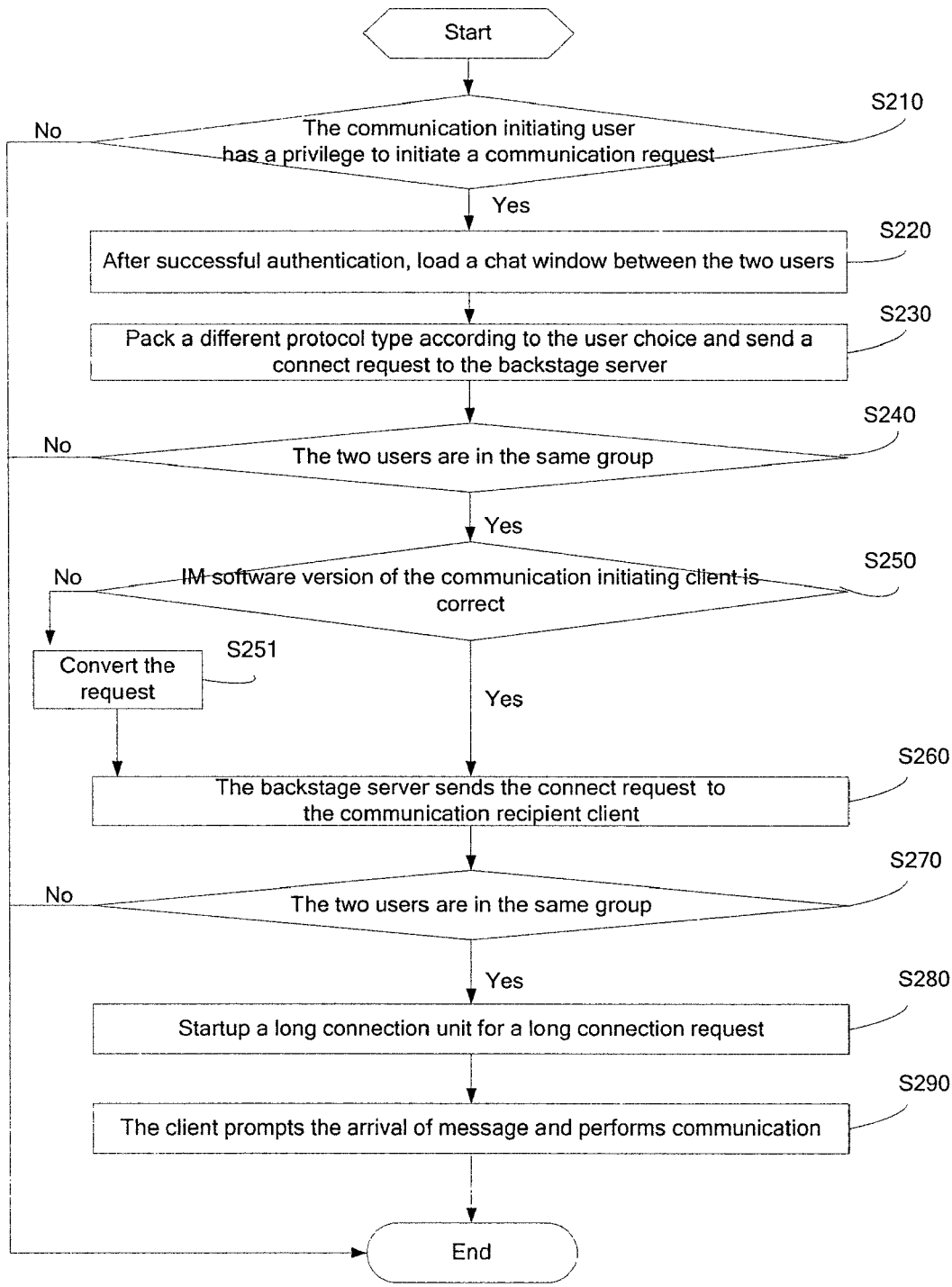
FIG. 2 is a flowchart of the communication among group members in an embodiment of the present invention.

FIG. 2 is a flowchart of the communication among group members in an embodiment of the present invention. As shown in FIG. 2, in a preferred embodiment of the present invention, group members communicate with each other in steps as follows.

Step S210: a first client, i.e., a communication initiating client, judges whether a communication initiating user has a privilege to initiate a connection request.

To be specific, when a communication initiating user initiates a connection request to another user in the group, i.e., a communication recipient user, the first client in the group communication system searches a local storage unit, and determines whether the two users are in a same group. If the two users are in the same group, the authentication succeeds and Step S220 shall be performed, otherwise the authentication fails and the operation is terminated.

Step S220: after the authentication succeeds, the first client loads a chat window for the communication initiating user to communicate with the communication recipient user, so as to facilitate various operations of the communication initiating user.

Step S230: the first client packs a protocol type according to the choice of the communication initiating user, (e.g., choosing plain text-based communication, file transmission or video and audio interaction), generates a connection request corresponding to the packed protocol type and containing an identifier of the communication recipient user and group identifier, and sends the connection request to a backstage server. When the user chooses plain text-based communication, the type of the connection request is short connection; when the user chooses to transmit a file or enter into video and audio interaction, the type of the connection request is long connection.

When the user chooses to transmit a file or enter into video and audio interaction, the first client loads and opens a corresponding network port and waits for the connection with the members that want to communicate.

When the user chooses plain text-based communication, the first client makes text information contained in the connection request, and sends the connection request to the backstage server.

Step S240: the backstage server unpacks the identifier of the communication recipient user and group identifier (e.g., group number) from the first client, searches a group member database and judges whether the communication initiating user and the communication recipient user are in a same group corresponding to the group identifier. If the two users are not in the same group, the backstage server returns error information to the communication initiating client and prompts a user.

Step S250: If the two users are in the same group, the authentication succeeds, and the backstage server judges whether the IM software version of the communication recipient client is lower than a particular version. If the IM software version is lower than the particular version, it can be determined that the software of the communication recipient client is unable to support advanced communication. In such case, when the type of the connection request is the short connection, the connection request is forwarded directly to a second client, i.e., a communication recipient client. And when the type of the connection request is the long connection, the backstage server forwards plain text information instead of the connection request directly to a second client, for example, a text message containing information of the communication initiating user and error information indicating incompatible version is forwarded instead of the connection request. If the IM software version is not lower than the particular version, Step S260 will be performed.

Step S260: the backstage server forwards the connection request from the first client to the second client of the communication recipient user.

Step S270: the second client receives the connection request from the backstage server, performs a protocol type judgment to determine whether a protocol type of the connection request is a valid protocol command. If the protocol type of the connection request is valid, the second client searches local storage information and judges whether the communication initiating user and the communication recipient user are in a same specific group. If the communication initiating user and the communication recipient user are not in the same group, the authentication fails and the unreliable connection request will be discarded; if the communication initiating user and the communication recipient user are in the same group, the authentication succeeds and the connection request will be further processed and Step S280 will be performed.

Step S280: the second client judges whether the type of the connection request is the long connection or short connection. If the type of the connection request is the long connection, the second client establishes a long connection channel to the first client based on IP address and port number of the first client forwarded by the backstage server, and performs an operation such as file transmission or video/audio interaction after the long connection channel is established between the first client and the second client. If the type of the connection request is the short connection, the second client extracts the text information from the connection request directly.

Step S290: the second client prompts the arrival of the message, e.g., by flashing a head or play a prompting sound, and when the user clicks, display a message as well as a notice on the file transmission or audio/video interaction in the window.

As described above, the group based communication system of the present invention brings a concept of virtual buddy, in another word; group members need not establish an actual buddy chain. Since a user who has some connection with a second user in the group, may be unwilling to be a buddy of the second user in practical, the group members are still able to enjoy advanced communication like buddies. That is, the group members may communicate in plain text as well as perform an advanced communication operation, such as transmitting file, multimedia audio/video to each other.

Since the group communication system is exposed in the Internet, security must be taken into consideration, and it also must be taken into consideration that the new technical scheme shall provide smooth transition from older communication technology, be compatible with group systems using the older communication technology and offer effective communication with members of the group system using the older communication technology.

In order to guarantee security of the group and group members and compatibility with older communication technology, the present invention imposes strict limit on the virtual buddy relationship that only members within a group may become virtual buddies and enjoy advanced communication, e.g., file transmission, just as actual buddies. The present invention further prevents malicious users from port attacks in the name of virtual buddies; furthermore, the present invention ensures users using lower version software can still enjoy plain text communication normally.

Figure 3:
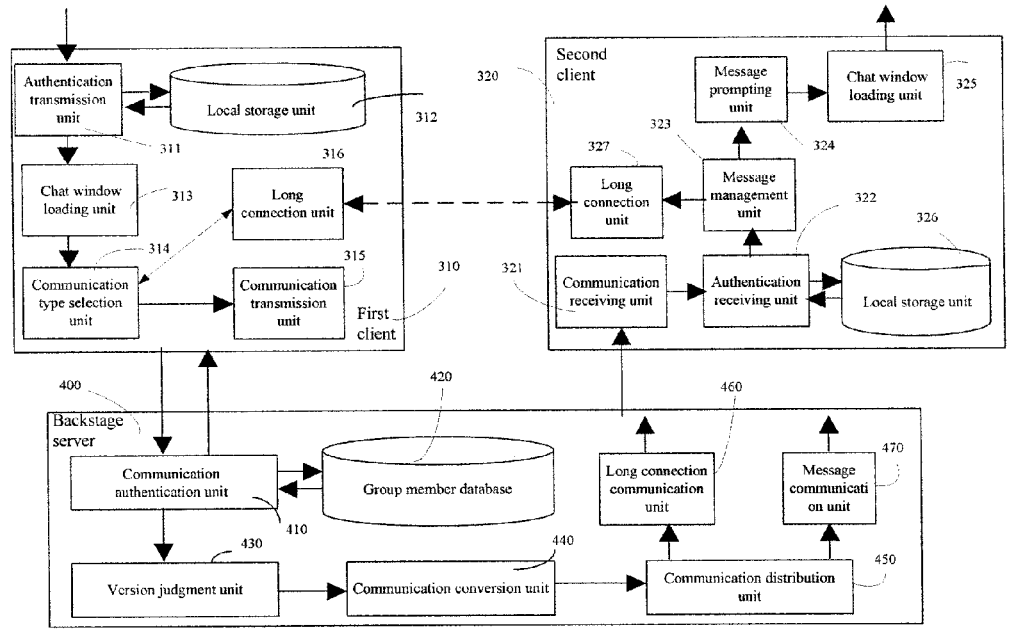
FIG. 3 is a block diagram illustrating the structure of the group based communication system in accordance with the present invention.

FIG. 3 is a block diagram illustrating the structure of the group based communication system in accordance with the present invention. As shown in FIG. 3, the group based communication system provided by the present invention includes a first client device 310 corresponding to a communication initiating user, i.e., a communication initiating client, a second client device 320 corresponding to a communication recipient user, i.e., a communication recipient client, and a backstage server 400.

In the system, the first client 310 includes an authentication transmission unit 311, a local storage unit 312, a chat window loading unit 313, a communication type selection unit 314, a communication transmission unit 315 and a long connection unit 316.

The second client 320 includes a communication receiving unit 321, an authentication receiving unit 322, a message management unit 323, a message prompting unit 324, a chat window loading unit 325, a local storage unit 326 and a long connection unit 327.

The backstage server 400 includes a communication authentication unit 410, a group member database 420, a version judgment unit 430, the communication conversion unit 440, a communication distribution unit 450, a long connection communication unit 460 and a message communication unit 470.

The primary units providing virtual buddy relationship among group members for an advanced operation such as file transmission and multimedia audio/video interaction among group members are described hereinafter, including the functions of the units and the logical steps of the units.

The authentication transmission unit 311 of the first client 310 judges whether the communication initiating user has a privilege to initiate a connection request. When the communication initiating user sends a connection request to another user in the group, the authentication transmission unit 311 searches the local storage unit 312 saving information of the communication initiating user and group information and judges whether the two users are in a same group. If the two users are in the same group, the authentication succeeds and the authentication transmission unit 311 instructs the chat window loading unit 313 to load a chat window. If the two users are not in the same group, the authentication fails and the procedure is terminated.

The chat window loading unit 313 loads the chat window for the chat between the two users after successful authentication so that the communication initiating user may perform varieties of operations.

The communication type selection unit 314 packs a different protocol type according to the choice of the communication initiating user, e.g., plain text communication, file transmission or audio/video communication, generates a connection request in the type of short connection or long connection and sends the connection request to the backstage server 400 through the communication transmission unit 315. When the user chooses to transmit a file or enter into video and audio interaction, the communication type selection unit 314 instructs the long connection unit 316 to load and open a corresponding network port and wait for the connection with members that want to communicate.

The communication authentication unit 410 of the backstage server 400 searches the group member database 420 based on the unpacked user identifier and group identifier from the first client and judges whether the two users that want to communication are in a same group corresponding to the received group identifier. If the two users are not in the same group, the communication authentication unit 410 returns an error message to the communication initiating client and prompts the user.

After the communication authentication unit 410 of the backstage server 400 performs a successful authentication, in another word, the two users are in the same group, the version judgment unit 430 judges the IM software version of the communication recipient client. If the version is lower than a particular version, the software of the communication recipient client is unable to support an advanced communication, then the communication conversion unit 440 sends a plain text message instead of the connection request to the second client 320 through the message communication unit 470.

The communication distributing unit 450 sends, according to the type of the connection request, the connection request in short connection type to the communication receiving unit 321 of the second client 320 through the message communication unit 470 and the connection request in long connection type to the communication receiving unit 321 of the second client 320 through the long connection communication unit 460.

The communication receiving unit 321 of the second client 320 receives the connection request from the backstage server 400 and judges whether a protocol type of the connection request is a valid protocol command. If the protocol type of the connection request is valid, the communication receiving unit 321 forwards the connection request to the authentication receiving unit 322, the authentication receiving unit 322 searches the local storage unit 326 saving information of the communication recipient user and group information, and judges whether the communication initiating user and the communication recipient user are in the same specific group. If the communication initiating user and the communication recipient user are not in the same specific group, the authentication fails, and the connection request is deemed as unreliable and discarded; if the communication initiating user and the communication recipient user are in the same specific group, the authentication succeeds, the authentication receiving unit 322 forwards the connection request to the message management unit 323 for further processing.

The message management unit 323 judges whether the type of the connection request is long connection and short connection. When the type of the connection request is the long connection, the message management unit 323 instructs the long connection unit 327 to establish a long connection channel to the first client 310 based on IP address and port number of the communication initiating user forwarded from the backstage server 400. When the long connection unit 316 of the first client 310 and the long connection unit 327 of the second client 327 are connected, an operation including file transmission and audio/video interaction can be performed. When the type of the connection request is the short connection, the communication receiving unit 321 extracts text information directly from the connection request forwarded from the backstage server 400, in another word, the short connection channel has been established as soon as the connection request is successfully forwarded. The message management unit 323, upon receipt of a message over the long connection channel or short connection channel, invokes the message prompting unit 324 to notify of the arrival of the message and instructs the chat window loading unit 325 to display the message.

The message management unit 323 invokes the message prompting unit 324 to notify of the arrival of the message, e.g., by flashing a head or playing a notifying sound. When the user clicks to require an operation, the message management unit 323 instructs the chat window loading unit 325 to load a chat window and display the message correctly in the window, and also display notice on the file transmission or audio/video interaction in the chat window.

Figure 4:
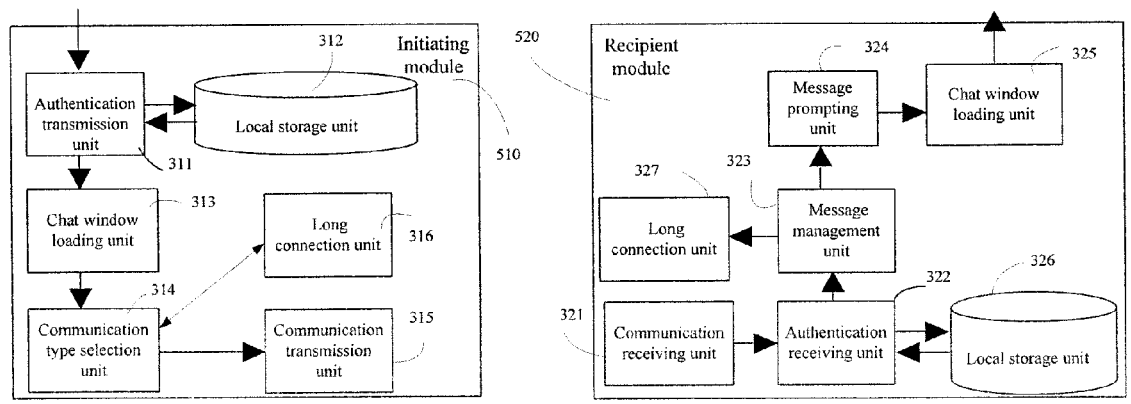
FIG. 4 is a block diagram illustrating the structure of a group based communication client in accordance with the present invention.

It should be understood that an IM client usually has both the function of transmitting and the function of receiving in practical, hence the function modules of the communication initiating client and the function modules of the communication recipient client can be integrated into one client. As shown in FIG. 4, an IM client with both the function of transmitting and the function of receiving includes an initiating module 510 and a recipient module 520. The initiating module 510 includes an authentication transmission unit 311, a local storage unit 312, a chat window loading unit 313, a communication type selection unit 314, a communication transmission unit 315 and a long connection unit 316, the functions of the units are exactly same as the corresponding functions of the units in FIG. 3. The recipient module 520 includes a communication receiving unit 321, an authentication receiving unit 322, a message management unit 323, a message prompting unit 324, a chat window loading unit 325, a local storage unit 326 and a long connection unit 327, and the functions of the units are exactly same as the corresponding functions of the units in FIG. 3.

Figure 5:
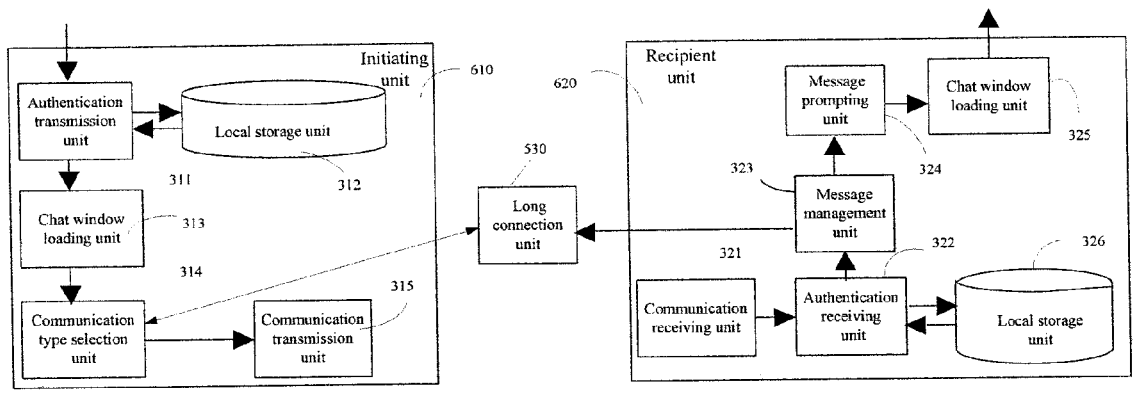
FIG. 5 is a block diagram illustrating the structure of another group based communication client in accordance with the present invention.

It should also be understood that the long connection unit 316 of the initiating module 510 and the long connection unit 327 of the recipient module 520 can be integrated into one unit. FIG. 5 shows a communication client with such integration. In FIG. 5, the communication client includes only one long connection unit 630, and neither the initiating module 610 nor the recipient module 620 includes any standalone long connection unit. It should further be understood that the local storage unit 312 and the local storage unit 326 also can be integrated into one unit.

To sum up, the present invention creates virtual buddies among group members and thus further facilitates the interaction and communication among group members, especially the interaction and communication among colleagues of online companies. And the virtual buddy scheme also gives careful consideration to the security of the group and group members and to the smooth communication with systems using older communication technology.

The forgoing is only preferred embodiments of the present invention. It is should be noted that, several improvement and modification made by those skilled in the prior art without departing from the principle of the present invention should be covered in the protection scope of the present invention.

The invention claimed is:

1. A client device for initiating, as a communication initiating client device, a connection request to a communication recipient client device via a backstage server, and for receiving, as a communication recipient client device, a connection request from a communication initiating client via a backstage server, comprising an initiating module and a recipient module, wherein the initiating module comprises: a first chat window loading unit, adapted to load a chat window and send data entered by a communication initiating user in the chat window to a communication type selection unit; the communication type selection unit, adapted to pack a corresponding protocol type according to the data entered by the communication initiating user in the chat window, generate the connection request, and instruct, when a type of the connection request is long connection, a first long connection unit to open a network port corresponding to the long connection; a communication transmission unit, adapted to send the connection request from the communication type selection unit to the backstage server; and the first long connection unit, adapted to open the network port corresponding to the long connection according to an instruction of the communication type selection unit; wherein the recipient module comprises: a communication receiving unit, adapted to receive the connection request from the backstage server and forward the connection request to a message management unit; the message management unit, adapted to judge whether a type of the connection request from the backstage server is the long connection or short connection, instruct a message prompting unit to prompt a message and instruct, when the type of the connection request is the long connection, a second long connection unit to establish a long connection channel to a communication initiating client; the second long connection unit, adapted to establish the long connection channel to the communication initiating client; the message prompting unit, adapted to prompt the message and instruct a second chat window loading unit to load a chat window; and the second chat window loading unit, adapted to load the chat window on the client.

2. The client device according to claim 1, wherein the initiating module further comprises: a first local storage unit, adapted to store information of the communication initiating user and member information of the group to which the communication initiating user belongs; and an authentication transmission unit, adapted to search the first local storage unit, judge whether the communication initiating user and a communication recipient user are in a same group, and instruct, if the two users are in the same group, the first chat window loading unit to load the chat window.

3. The client device according to claim 1, wherein the recipient module further comprises: a second local storage unit, adapted to store information of the communication recipient user and member information of the group to which the communication recipient user belongs; an authentication receiving unit, adapted to search the second local storage unit, judge whether the communication initiating user and the communication recipient user are in a same group, and instruct, if the two users are in the same group, the message management unit to establish a connection according to a type of the connection request.

4. The client device according to claim 1, wherein the first long connection unit and the second long connection unit can be integrated into one unit.

5. The client device according to claim 1, wherein the first local storage unit and the second local storage unit can be integrated into one unit.

* * * * *

UNITED STATES PATENT AND TRADEMARK OFFICE
CERTIFICATE OF CORRECTION

| | | |
|---|---|---|
| PATENT NO. | : 7,844,664 B2 | Page 1 of 1 |
| APPLICATION NO. | : 11/916790 | |
| DATED | : November 30, 2010 | |
| INVENTOR(S) | : Bin Li et al. | |

It is certified that error appears in the above-identified patent and that said Letters Patent is hereby corrected as shown below:

Title page, item (73) should read as follows:
**(73) Assignee: Tencent Technology (Shenzen) Company Ltd.
                Shenzen (CN)**

Signed and Sealed this
Twentieth Day of December, 2011

David J. Kappos
*Director of the United States Patent and Trademark Office*